C. E. WHITE.
TOOL SHIFTING MECHANISM FOR AGRICULTURAL IMPLEMENTS.
APPLICATION FILED MAR. 24, 1910.
1,247,762.
Patented Nov. 27, 1917.
4 SHEETS—SHEET 1.
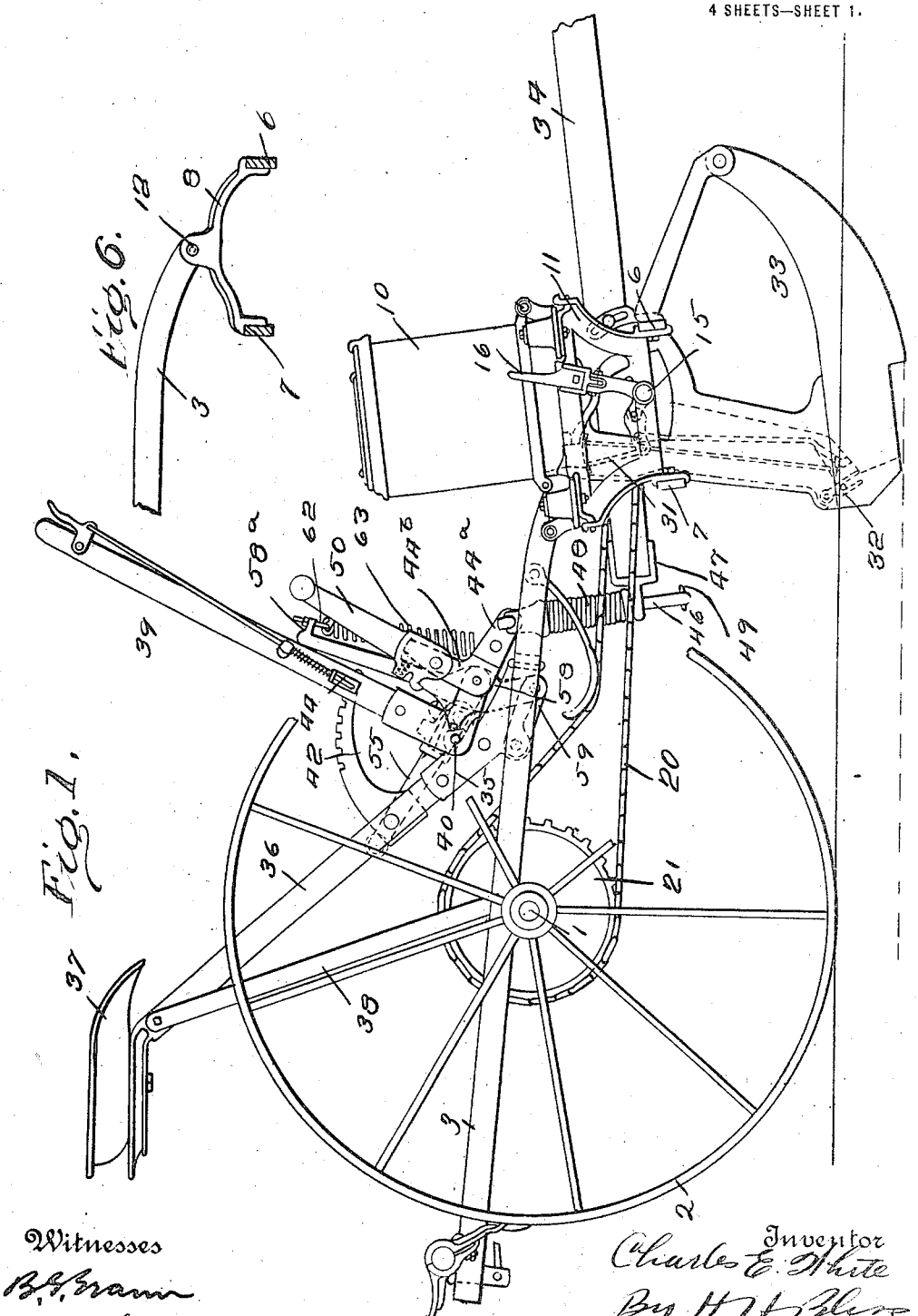

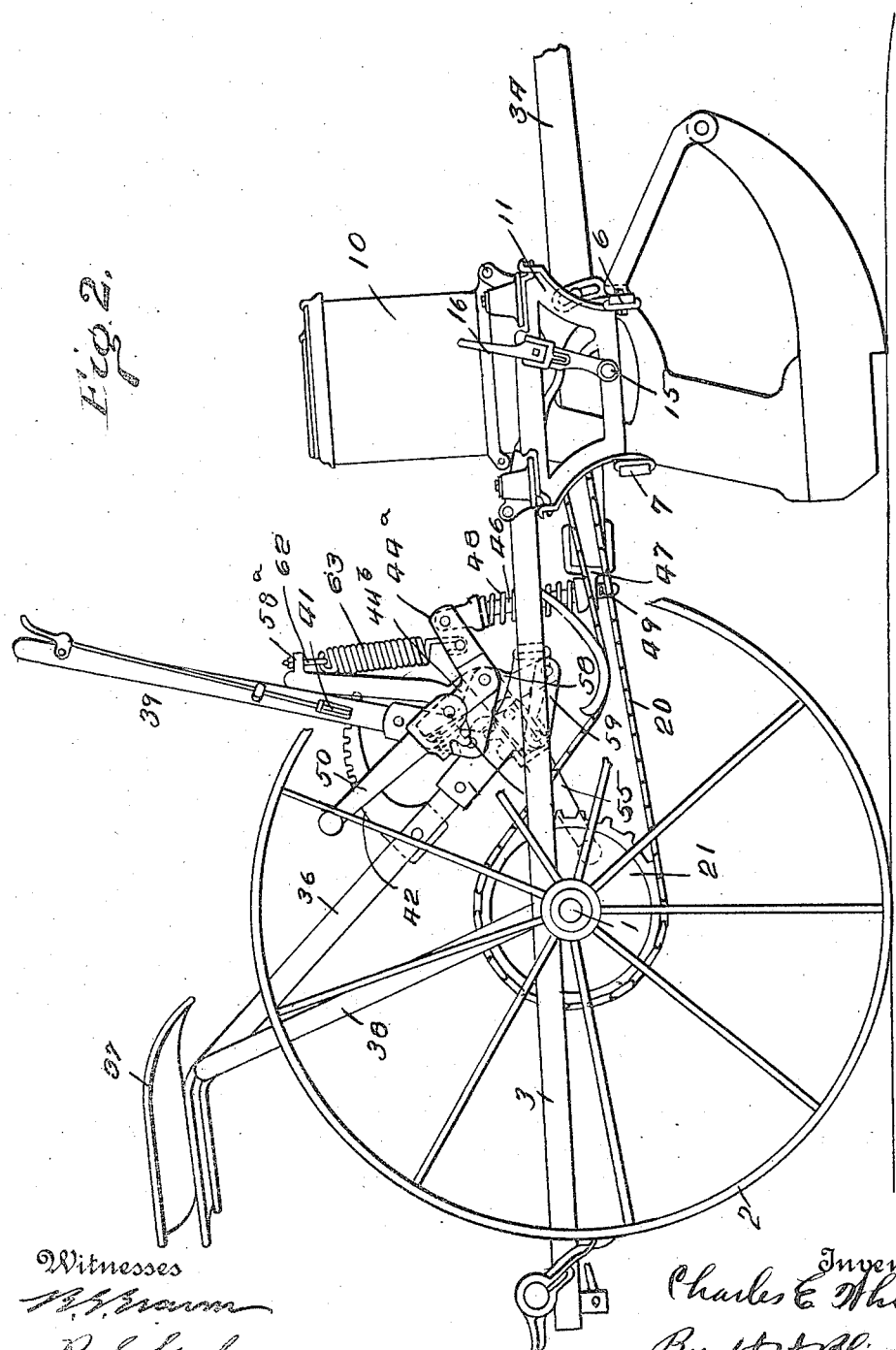

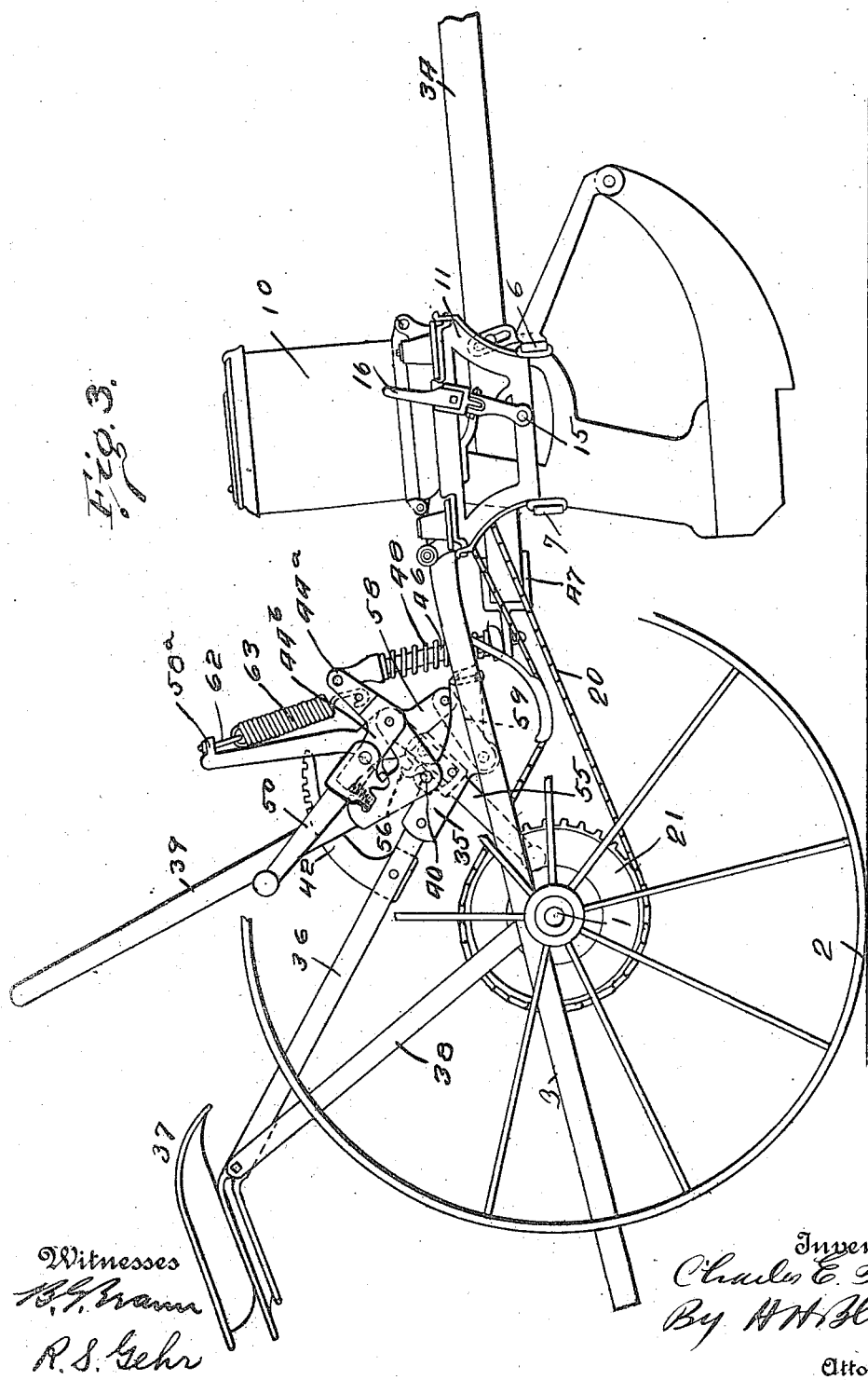

C. E. WHITE.
TOOL SHIFTING MECHANISM FOR AGRICULTURAL IMPLEMENTS.
APPLICATION FILED MAR. 24, 1910.
1,247,762. Patented Nov. 27, 1917.
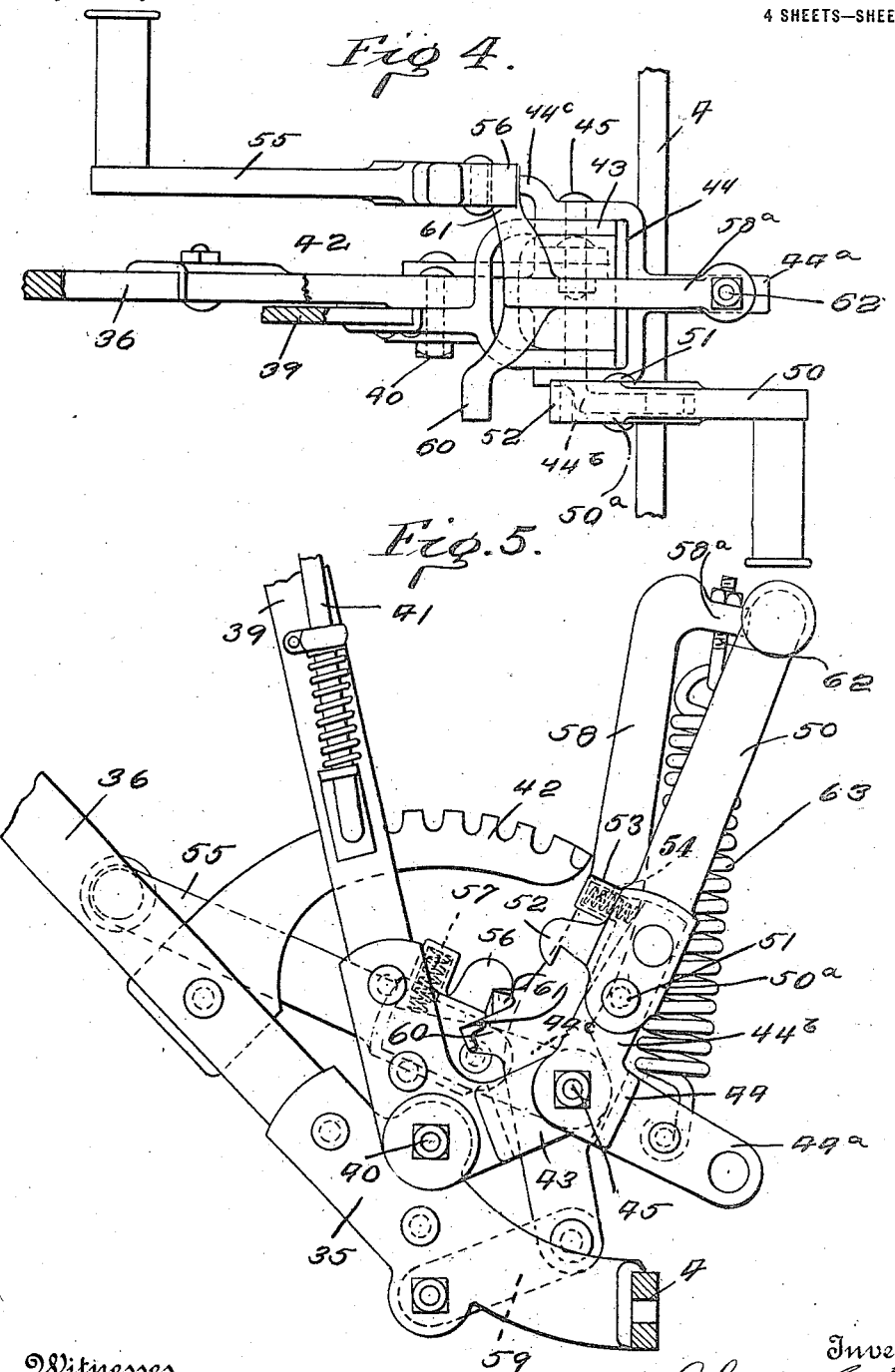

UNITED STATES PATENT OFFICE.

CHARLES E. WHITE, OF MOLINE, ILLINOIS, ASSIGNOR TO DEERE & MANSUR CO., A CORPORATION OF ILLINOIS.

TOOL-SHIFTING MECHANISM FOR AGRICULTURAL IMPLEMENTS.

1,247,762.     Specification of Letters Patent.     Patented Nov. 27, 1917.

Application filed March 24, 1910. Serial No. 551,395.

*To all whom it may concern:*

Be it known that I, CHARLES E. WHITE, a citizen of the United States, residing at Moline, in the county of Rock Island and State of Illinois, have invented certain new and useful Improvements in Tool-Shifting Mechanism for Agricultural Implements, of which the following is a specification, reference being had therein to the accompanying drawing.

This invention relates to improvements in agricultural implements such as planters and others which are similar thereto as concerns the frames which adjust and support the tools. The improvements are particularly applicable to corn planters of the "hinge frame" type. Each is usually made with a vertically vibratable main frame mounted at the axis of two ground wheels around which it vibrates, and a supplemental tool-carrying, or runner, frame in front, hinged to the main frame, and also supplementally joined thereto by flexible connecting devices.

The object of this invention is to provide for such implements a mechanism by means of which the driver can at will vibrate the two frames vertically, and, while doing so, first, be able to carry the tool frame from those positions where it is held entirely out of operation down to its lowermost position; second, be able, while swinging the frames, to place the tool frame at either of several working positions; third, be able to lock them optionally in any desired position; and, fourth, also be able to release the locking mechanism at any time; and accomplish all these matters with the minimum degree of bodily movement of his feet or hands.

It is essential in many farm implements such as corn planters that means be provided whereby the depth to which the earth tools penetrate can be quickly and accurately adjusted while they are at work. It is also desirable in such implements that means be provided whereby the tools can be easily and quickly raised from the ground either at the end of a field or when an obstruction is met with without disturbing the adjustment of the parts which determine the depth of soil penetration.

In operating some implements the driver's attention must be closely directed to a number of matters quite aside from the position and operation of the tools. For example, in operating a planter he must give attention to the check wire and the tappet mechanism, and he must constantly have in consideration the accurate guidance of his team to insure accuracy in planting and checking the rows. His hands are occupied in manipulating the reins, at all times, and especially at the end of a row; and it becomes desirable for him to be able to attain the above changes in positions of the tools, and to release and lock them by means of his feet to as full an extent as possible.

Prolonged movements of his feet are not practicable. I have devised a construction in which two structural matters are brought to his assistance; I provide for the automatic movement vertically of the fulcrum parts, upon which the footlevers act, in relation to the wheel frame, and also provide for the vertical movement of the supporting frame itself. The earlier constructions, with which I am acquainted, in each of which use was made of a foot lever, were objectionable for the reason that the lever must move about its axis through a large angle corresponding to the movement of the tools from their lowermost position to their uppermost position. Such large angle of movement is objectionable because of the relatively small effectiveness of the motion of the lever at the ends of the oscillation and because of the difficulty experienced by the operator in moving the lever through an extended path. And a long arm connected to the runner frame is objectionable because of its small mechanical advantage.

One of the objects of this invention is to provide in an implement of this sort, in combination with the oppositely swinging main and tool frames and the parts attached thereto, a mechanism in which there is a foot lever for vertically shifting the tool frame to bring the tools into operative or inoperative positions, and means permitting the said lever to be raised or lowered bodily in relation to the frames, and also moved bodily in relation to the ground, and to be fixed at any one of several elevations according to the depth of penetration desired. By preference the vertical movement of the said lever is provided for by mounting its pivot upon or connecting it to a second lever (preferably a hand lever) which can be locked in any desired position and which need not have any movement bodily relatively to both frames; and by preference I provide a locking means for the first lever which is independent of the second lever and which prevents angular movement of the first lever as it moves bodily vertically.

In the accompanying drawings:

Figure 1 is a side elevation of an implement embodying my invention, the earth-working parts being shown in their lower or operative positions.

Fig. 2 is a side elevation with the earth-working parts raised to a position where they are just above the ground.

Fig. 3 is a side elevation showing the front frame and the frame carrying the operative parts lifted to their highest positions; those which they occupy when the machine is being turned or is being transported to or from the field.

Fig. 4 is a plan view on a larger scale showing the mechanism for adjusting the frames and for locking them.

Fig. 5 is a side elevation of the mechanism shown in Fig. 4.

Fig. 6 is a view showing the adjacent parts of the frames which are hinged together.

Referring to the parts of the implement shown in the drawings (which is a corn planter and here selected for illustration), 3 indicates the bars of a main frame resting on the axle 1 of ground wheels 2. This frame is adapted to vibrate vertically around the axis of the wheels from the position shown in Fig. 1 to that shown in Fig. 3. The tool-carrying frame, in this case a planter runner frame, comprises the bars 6 and 7, and cross bars, braces or frames 8 and 11, and has the draft tongue 34 rigidly connected thereto. It supports the runners 33, the seed receptacles 10, the check head frames, and the tappet-actuated mechanism at 16. The tool, or runner, frame is pivotally connected at 12 on a transverse horizontal axis to the rear or wheel frame and is also vertically vibratable from the position shown in Fig. 1 to that shown in Fig. 3. The adjacent parts of the two frames move together vertically, the front or tool frame moving around an approximately fixed center at the neck yoke while the rear frame moves, as stated, around the axis of the ground wheels. There is also a flexible connection between the frames comprising parts to be referred to below. The tongue 34 is rigidly secured at its rear end to the front frame. Upon this tongue and the wheels 2 the entire mechanism is supported To the cross bar 4 of the wheel frame is secured a casting or bracket 35, to which is bolted or riveted the upwardly and rearwardly extending bar 36, upon the upper end of which is mounted the driver's seat 37, the bar 36 and seat 37 being suitably supported and braced by bars 38, 38, which extend from the seat downward and outward to the side bars 3, 3, of the frame. 43 is a carrier which is pivoted at 40 on the bracket 35 and which has a forward extending forked arm upon the end of which is mounted a foot lever mechanism. 39 is a hand lever secured to the carrier 43 and provided with a locking bolt 41 which coöperates with a toothed segment 42 rigidly secured to the bar 36. The foot lever mechanism comprises a central body part 44 which is pivotally connected by means of the pin or bolt 45 with the forked arm 43 of the carrier. The body part 44 is formed with a forward extending shank 44$^a$, to the end of which is secured a depending link or rod 46. This link or rod has its lower end extending through a bracket 47 on the rear end of the tongue. 48 is a coiled spring interposed between the upper end of the link and bracket 47, and 49 is a cotter pin in the lower end of the link 48 which serves to prevent the withdrawal of the link from the bracket 47.

The body part 44 is also formed on its right side with a shank 44$^b$ and on its left side with a similar shank 44$^c$. 50 is a foot lever arm which is pivotally mounted on the shank 44$^b$, the lower end of said lever arm being formed with a socket 50$^a$ to receive the end of the shank 44$^b$. 51 is a pivot pin or bolt which secures the two parts together. The end of the shank 44$^b$ is tapered, as shown by dotted lines in Fig. 5, so that a certain amount of lost motion is provided between the shank 44$^b$ and the lever arm 50. The lower end of the lever arm 50 carries a locking hook or catch 52 which coöperates with a part which will presently be described. The lower end of the foot lever arm is also provided with a socket 53 to receive a coiled spring 54, one end of which presses against the end of the shank 44$^b$, so that the lever arm 50 is normally pressed backward by the spring.

55 is a foot lever arm mounted on the left shank 44$^c$ of the body part 44. This foot lever arm is formed and mounted in a manner similar to the foot lever arm 50, but with this difference: Its locking hook or catch 56 extends forward and the coiled spring 57 is correspondingly mounted so as to press the foot lever 55 forward relative to the shank 44$^c$.

58 is a standard which is pivotally connected with the hand lever and the foot lever by means of the aforesaid pin or bolt 45 and which is connected at its lower end by means of a link 59 with the bracket 35, said link being parallel to the arm 43 of the hand lever and equal in length to said arm. On its rear side the standard 58 is provided with laterally extending lugs 60 and 61. These lugs serve as latch keepers in coöperation with the locking hooks or catches 52 and 56, respectively. At its upper end the standard 58 has a forward extension 58ª in which is mounted an eye-bolt 62 to receive the upper end of a heavy coiled spring 63, the lower end of which is secured to the forward extending arm 44ª of the foot lever mechanism. The tendency of this spring is to lift the arm 44ª and it serves, therefore, to partially counterbalance the weight of the front frame of the machine.

In the operation of the implement the front frame can be raised and lowered by operating the hand lever alone or by operating only the foot levers. Thus, let it be supposed that the machine is in operation with the parts in the positions shown in Fig. 1, the tools entering the soil to such an extent as to secure penetration to the desired depth. The hand lever is locked in position and the catch 56 of the left foot lever arm is in locking engagement with the keeper 61 on the standard 58. If, in passing over the field, a spot of unusually hard soil is reached, the driver can place his right foot upon the lever arm 50 and by pressing forward maintain the tool at the proper depth in spite of the hardness of the soil, which would otherwise tend to lift the tool and front frame of the machine more or less. In a similar way the right foot lever arm can be employed to force the front frame downward in passing over a dead furrow or the like. On the other hand, when the machine passes over a spot of exceptionally soft or mellow soil, the driver can relieve the downward pressure upon the front frame of the machine and prevent its sinking too deep by putting his left foot upon the lever arm 55 and pressing downward. If at any time it is desired to change the depth of the soil penetration, this can be done by adjusting the carrier by means of the hand lever, the movement of this carrier causing the entire system of foot levers to move bodily with it, because the body part 44 of the foot lever mechanism has a fulcrum support upon the swinging arm 43. Such bodily movement of the foot lever mechanism does not affect its operativeness, the latch keeper on standard 58 being maintained in the same relation to the foot lever parts in all positions of the carrier and the hand lever because of the parallel link supports of the standard.

Having once determined the depth of the soil penetration by adjusting the hand lever and the carrier, it is not necessary to disturb this adjustment for the purpose of lifting the machine at the ends of the successive lines of operation, for when the end of a line is reached the machine can be lifted by simply pressing upon the left foot lever arm 55. When this lever is thrown down the parts are moved to the positions shown in Fig. 2, the catch 52 of the right foot lever arm 50 coming into engagement with its keeper 60 so that the parts are locked in their lifted position. Of course, if it is not desired to lock the machine up in such position, the foot lever arm 55 need not be thrown down to the extreme limit of its movement and then when pressure is relieved from lever arm 55, the parts will move downward by their own weight. It will be understood that when the parts are moved from the positions shown in Fig. 1 to those shown in Fig. 2, by forcing the foot lever arm 55 downward, the first movement of the foot lever arm 55 serves to take up the lost motion between it and the shank 44ᶜ, and to simultaneously detach the catch 56 from its keeper 61, the driver needs to give no attention whatever to the operation of the catch, because it is a part of the regular swinging movement of the lever which actuates the catch. This is an advantage which will readily be appreciated by those familiar with the handling of machines of this character. If the machine is locked up in the position shown in Fig. 2, it can readily be lowered again by simply pressing forward upon the right foot lever arm 50, the first part of the movement of said lever arm serving to take up lost motion and disengage the catch 52 in the manner previously described.

When the machine is to be transported from place to place, it is desirable to lift the front frame to its highest position, as shown in Fig. 3, and this, of course, is done by throwing the hand lever back as far as it will go and then throwing the left foot lever arm 55 downward to its extreme position.

It will be noted that by providing the two levers, connected and related in the way described, to each other and to the vertically movable frames which carry the levers bodily with them, I avoid a large angle of movement for either of the latter and I also avoid a long lever arm connected with the tool frame. The vertically moving frames and the several parts are so related that the work of effecting the adjustment is divided substantially equally between the two levers with the result that a relatively small force applied through a relatively small distance is sufficient for either of them.

Not only have I provided an adjustable foot control mechanism for raising and lowering the tool frame which is bodily adjustable relatively both to the ground and to the frames, but I have also so constructed this mechanism that the driver, by the simple pressure of his foot on one foot rest, can raise the tools and, by the simple pressure of his foot on the other foot rest, can lower them. There are no troublesome independent locks to be manipulated, and I believe myself to have been the first to provide means whereby both raising and lowering can each be effected by a single foot motion.

What I claim is:—

1. In a mechanism for shifting vertically the earth-working tools of argicultural implements, the combination of a front tool-carrying frame, a rear wheel-mounted frame carrying a driver's seat, the said frame being pivoted together on a transverse axis and vibrating in opposite directions, earth-working tools carried by the tool frame, a carrier mounted on the main frame to move vertically therewith and vertically adjustable thereon, a lever pivoted to the carrier, a connection between the lever and the tool frame whereby the vertical position of said frame and the tools can be controlled either by the vertical adjustment of the said carrier or by the movement of the said lever about its pivot, and a spring interposed between the lever and the adjustable carrier to partly counterbalance the weight of the tool frame and attached parts.

2. In a mechanism for shifting vertically the earth-working tools of agricultural implements, the combination of a front tool-carrying frame, a rear wheel-mounted frame carrying a driver's seat, the said frames being pivoted together on a transverse axis and vibrating in opposite directions, earth-working tools carried by the tool frame, a tongue rigidly connected to the tool frame whereby both frames are supported exclusively by the tongue and the wheels, a manually adjustable lever on the main frame, a lock for holding said lever in adjusted position, a second adjustable lever pivoted on the first lever to be movable therewith downward relatively to the ground and to the main frame when the first lever is moved forward and upward relatively to the ground and to the main frame when the first lever is moved backward, a connection between the second lever and the tool frame for moving the tools downward when the second lever is moved forward and for moving the tools upward when the second lever is moved backward, and means operable when the second lever is in its forward or in its backward position for locking it against movement with respect to the first lever, the entire construction being such that the movement of either lever will change the relative positions of the frames and simultaneously adjust vertically the positions of the tools.

3. In a mechanism for shifting vertically the earth-working tools of agricultural implements, the combination of a front tool-carrying frame, a rear wheel-mounted frame carrying a driver's seat, the said frames being pivoted together on a transverse axis and vibrating in opposite directions, earth-working tools carried by the tool frame, a shifting mechanism carried by the main frame and movable vertically therewith and movable vertically relatively thereto and flexibly connected to the tool-carrying frame, said mechanism comprising two independent sets of locking devices and two power-applying lever-like devices respectively accessible to the feet of the driver, one for unlocking the tool frame and pushing it down, and the other for both unlocking and elevating both frames to inoperative positions.

4. In a mechanism for shifting vertically the earth-working tools of agricultural implements, the combination of a front tool-carrying frame, a rear wheel-mounted frame carrying a driver's seat, the said frames being pivoted together on a transverse axis and vibrating in opposite directions, earth-working tools carried by the tool frame, a shifting mechanism carried by the main frame and movable vertically therewith and movable vertically relatively thereto and flexibly connected to the tool-carrying frame, said mechanism comprising two independent sets of locking devices, two vertically moving power-applying lever-like devices respectively accessible to the feet of the driver, one for unlocking the tool frame and pushing it down, and the other for both unlocking and elevating both frames to inoperative positions, and a lever on the main frame for moving the shifting mechanism vertically.

In testimony whereof I affix my signature in presence of two witnesses.

CHARLES E. WHITE.

Witnesses:
OSCAR F. LUNDAHL,
ROBERT M. ADAMS.